United States Patent [19]

Chiba et al.

[11] Patent Number: 5,347,406
[45] Date of Patent: Sep. 13, 1994

[54] DIGITAL VIDEO RECORDING APPARATUS FOR RECORDING DIGITAL VIDEO SIGNALS OF REDUCED BIT RATE ON MAGNETIC TAPE HAVING PARTICULAR THICKNESS, ENERGY PRODUCT AND SURFACE ROUGHNESS

[75] Inventors: Kazunobu Chiba; Kenichi Sato; Yuichi Arisaka, all of Miyagi, Japan

[73] Assignee: Sony Corporation, Tokyo, Japan

[21] Appl. No.: 83,990

[22] Filed: Jun. 28, 1993

Related U.S. Application Data

[60] Division of Ser. No. 784,751, Oct. 30, 1991, Pat. No. 5,253,122, which is a continuation-in-part of Ser. No. 768,871, Oct. 29, 1991.

[30] Foreign Application Priority Data

Oct. 31, 1990 [JP] Japan .................. 2-294676

[51] Int. Cl.$^5$ ........................... H04N 5/783
[52] U.S. Cl. ........................... 360/33.1; 358/330; 358/335; 360/15; 360/32; 360/40
[58] Field of Search ............ 360/9.1, 15, 16, 17, 360/22, 32, 33.1, 38.1, 39, 40, 41, 42, 43, 48, 52, 134, 902; 358/330, 335; 428/694 ML

[56] References Cited

U.S. PATENT DOCUMENTS 3,858,514  1/1975  Beebe et al. .................. 360/16 X
3,995,313  11/1976 Fayling ........................ 360/15
4,651,232  3/1987  Lemoine et al. ............... 360/9.1

FOREIGN PATENT DOCUMENTS 0092403  10/1983  European Pat. Off. .
0226162  6/1987   European Pat. Off. .
0239326  9/1987   European Pat. Off. .
3045000  9/1981   Fed. Rep. of Germany .

OTHER PUBLICATIONS

"Analog Viterbi Decoding for High speed Digital Satellite Channels," A. S. Acampora et al., IEEE Transactions on Communications, vol. Com. 26, No. 10, Oct. 1978, pp. 1463–1470.
"The Viterbi Algorithm," G. D. Forney, Jr., Proceedings of the IEEE, vol. 61, No. 3, Mar. 1973, pp. 268–278.

Primary Examiner—W. R. Young
Attorney, Agent, or Firm—William S. Frommer; Alvin Sinderbrand

[57] ABSTRACT

A magnetic tape for the recording of digital video signals is constituted by a nonmagnetic base having thereon a magnetic layer of at least one thin magnetic metal film which has an energy product of at least 100 G.cm.Oe, and with the surface roughness of the magnetic tape being at most 0.003 μm in center line average height. Such tape, when used with magnetic heads each having a gap defined between portions of the respective head having a saturation magnetic flux density of at least 14 kG., contribute to the maintenance of an acceptable raw error bit rate below $1 \times 10^{-4}$ when recording with a recorded bit area of no more than 1.25 μm$^2$/bit.

13 Claims, 9 Drawing Sheets

F I G. 14
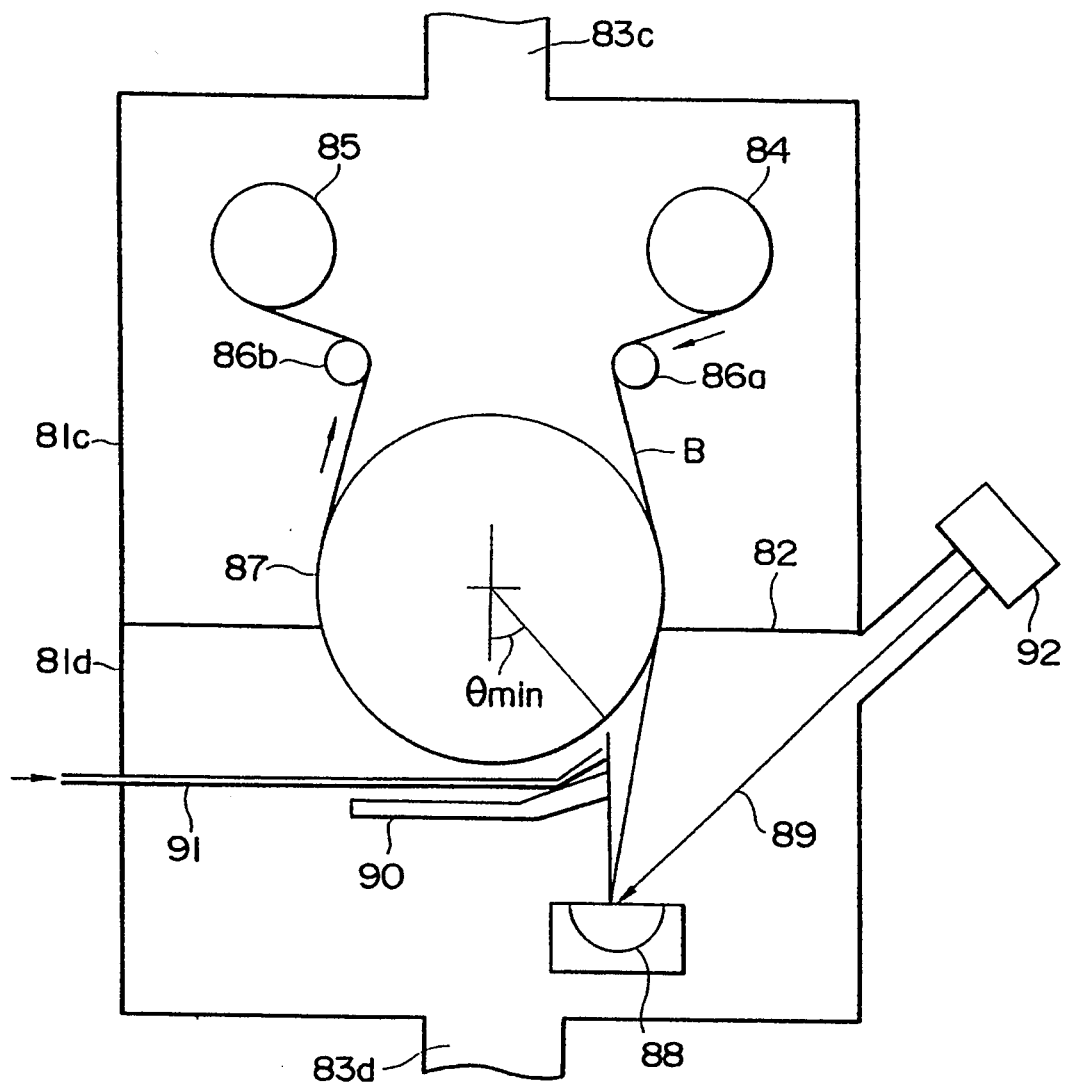

DIGITAL VIDEO RECORDING APPARATUS FOR RECORDING DIGITAL VIDEO SIGNALS OF REDUCED BIT RATE ON MAGNETIC TAPE HAVING PARTICULAR THICKNESS, ENERGY PRODUCT AND SURFACE ROUGHNESS

This application is a division of application Ser. No. 07/784,751, filed Oct. 30, 1991, now U.S. Pat. No. 5,253,122, which application is a continuation-in-part of U.S. patent application Ser. No. 07/768,871, filed Oct. 29, 1991, now pending and which is the U.S. National Phase of International Application No. PCT/JP91/00755, filed Jun. 5, 1991, and the disclosure of said application is incorporated herein by reference.

BACKGROUND OF THE INVENTION

1. Field of the Invention

This invention relates generally to a method and apparatus for the magnetic recording of digital video signals and to a magnetic recording medium for use therein.

2. Description of the Prior Art

A D1 format component type digital VTR and a D2 format composite type digital VTR have been developed for use by broadcasting stations in digitizing color video signals and recording the digitized signals on a recording medium, such as a magnetic tape.

In the D1 format digital VTR, a luminance signal and first and second color difference signals are A/D converted with sampling frequencies of 13.5 MHz and 6.75 MHz, respectively. Thereafter, the signals are suitably processed and then recorded on a tape. Since the ratio of sampling frequencies of the signal components is 4:2:2, this system is usually referred to as the 4:2:2 system.

On the other hand, in the D2 format video digital VTR, a composite video signal is sampled with a signal having a frequency 4 times higher than the frequency fsc of a color subcarrier signal and then A/D converted. Thereafter, the resultant signal is suitably processed and then recorded on a magnetic tape.

Since these known D1 and D2 format digital VTRs are designed for professional use, for example, in broadcasting stations, the attainment of high picture quality is given top priority in the design and construction of such VTRs, and the weight and size of the apparatus are not overly important.

In these known digital VTRs, the digital color video signal, which results from each sample being A/D converted into, for example, 8 bits, is recorded without being substantially compressed. As an example, when the known D1 format digital VTR A/D converts each sample into 8 bits with the frequencies noted above, the data rate representing the color video signal is approximately 216 Mbps (megabits per second). When the data in the horizontal and vertical blanking intervals are removed, the number of effective picture elements of the luminance signal per horizontal interval and the number of effective picture elements of each color difference signal per horizontal interval become 720 and 360, respectively. In the NTSC system which has 525 lines per frame and 60 fields per second, the number of effective scanning lines for each field is 250, and the data bit rate Dv can be expressed as follows:

$$Dv = (720 + 360 + 360) \times 8 \times 250 \times 60 = 172.8 \text{ Mbps}$$

Even in the PAL system, since the number of effective scanning lines for each field is 300 and the number of fields per second is 50, it is obvious that the data bit rate in the PAL system is the same as that in the NTSC system. If the redundant components necessary for error correction and the format with respect to such data are considered, the total bit rate of picture data becomes approximately 205.8 Mbps.

Further, the amount of audio data Da is approximately 12.8 Mbps, while the amount of additional data Do, such as, data of a gap, a preamble, and a postamble used in editing, is approximately 6.6 Mbps. Thus, the bit rate of information data to be recorded can be expressed by the following equation:

$$Dt = Dv + Da + Do$$

$$Dt = 172.8 + 12.8 + 6.6 = 192.2 \text{ Mbps}$$

In order to record such amount of information data, the known D1 format digital VTR employs a segment system having a track pattern comprised of 10 tracks for each field in the NTSC system, or comprised of 12 tracks for each field in the PAL system.

In the known D1 format digital VTRs, a recording tape with a width of 19 mm is used. There are two types of recording tapes having thicknesses of 13 $\mu$m and 16 $\mu$m, respectively. To house these tapes, there are three types of cassettes, which are respectively characterized as being of the large size, middle size, and small size. The information data is recorded on such tapes in the above mentioned format with the tape area for each bit of data being approximately 20.4 $\mu m^2$/bit, which corresponds to a recording density of 1/20.4 bit/$\mu m^2$. When the recording density is increased, an error tends to take place in the playback output data due to interference between codes or nonlinearity of the electromagnetic conversion system of the head and tape. Heretofore, even if error correction encoding has been performed, the above given value of the recording density has been the limit therefor.

By putting all the above described parameters together, the playback times for the cassettes of various sizes and the two tape thicknesses, when employed in the digital VTR in the D1 format can be tabulated as follows:

| Size/tape thickness | 13 $\mu$m | 16 $\mu$m |
|---|---|---|
| Small | 13 minutes | 11 minutes |
| Middle | 42 minutes | 34 minutes |
| Large | 94 minutes | 76 minutes |

Although the described D1 format digital VTR can provide satisfactorily high picture quality for use in broadcasting stations, even if a large cassette housing a tape with a thickness of 13 $\mu$m is used, the playback time is at most 1.5 hours. Thus, such a VTR is not adequate for consumer or home use in which a playback time at least sufficient for the 5 recording of a telecast movie is required. On the other hand, in VTRs intended for consumer or home use, the $\beta$ system, the VHS system, the 8-mm system, and so forth have been employed. However, in each of these systems for consumer or home use, analog signals have been recorded and reproduced. Although the picture quality of these analog VTRs has been improved to the point where the quality is satisfactory when a video signal is simply recorded and then reproduced for viewing, the picture quality is significantly degraded when the recorded signal is dubbed and copied. Thus, when the recorded signal is dubbed several times, the picture quality will become unacceptable to the viewers.

If signals of wave lengths as short as 0.5 $\mu$m are recorded in tracks having a width of 5 $\mu$m so as to achieve a recording area of 1.25 $\mu m^2$ per bit, that is, a recording density of 0.8 bit per $\mu m^2$, and if such recording operation is performed in conjunction with a suitable data compression which adequately compresses the recording data without substantial distortion of the reproduced signals, then long-timed digital recording and reproducing of video signals may be possible even with magnetic tapes having a width of 8 mm or less and a length that can be readily contained in a cassette of a size not substantially larger than the cassette used with the analog 8-mm system.

However, attempts to decrease the recorded bit area to about 1.25 $\mu m^2$ per bit have resulted in unacceptably high bit error rates upon playback.

OBJECTS AND SUMMARY OF THE INVENTION

Accordingly, it is an object of the present invention to provide a method for magnetically recording digital video signals on a magnetic recording medium with a recorded bit area no greater than 1.25 $\mu m^2$ per bit, and with an acceptably low raw bit error rate, that is, a bit error rate prior to error correction of the reproduced digital video signals, that is no greater than $1 \times 10^{-4}$.

Another object of the present invention is to provide a magnetic recording medium which, when digital video signals are recorded thereon with a recorded bit area no greater than 1.25 $\mu m^2$ per bit, contributes to the maintenance of the desired raw bit error rate to no more than $1 \times 10^{-4}$.

Still another object of the present invention is to provide a magnetic transducer head which, when used in combination with the aforesaid magnetic recording medium in a digital VTR, contributes to the desired high recording density and low raw bit error rate for making practical the digital recording of a video signal of a long time period, for example, as much as four hours, on a magnetic tape having a width of 8 mm or less and a length that can be readily contained in a cassette housing not substantially larger than that used with the analog 8 mm system.

In accordance with an aspect of this invention, in a method and apparatus for magnetically recording digital video signals; input digital video signals are converted into data segmented into blocks each composed of a plurality of pixel data; such blocks of pixel data are compression-coded block-by-block; the compression-coded data are converted into channel-encoded data; and the channel-encoded data are supplied to magnetic heads on a rotary drum for recording by such heads on a magnetic recording medium constituted by a nonmagnetic base having thereon a magnetic layer of at least one thin magnetic metal film which has an energy product of at least 100 G.cm.Oe, and with the surface roughness of said magnetic recording medium being at most 0.003 $\mu$m in center line average height.

In accordance with another aspect of this invention, each of the magnetic heads has a gap defined between portions of the respective head having a saturation magnetic flux density of at least 14 kG.

Preferably, in accordance with this invention, the magnetic layer comprises a plurality of the thin magnetic metal films which are successively slant deposited on said base in an oxygen atmosphere.

The above, and other objects, features and advantages of the invention, will be apparent in the following detailed description of illustrative embodiments thereof when read in connection with the accompanying drawings in which corresponding elements are identified by the same reference numerals in the several views.

BRIEF DESCRIPTION OF THE DRAWINGS

FIG. 14 is a schematic diagram illustrating another method of producing a magnetic tape according to this invention.

DETAILED DESCRIPTION OF PREFERRED EMBODIMENTS OF THE INVENTION

Figure 1:
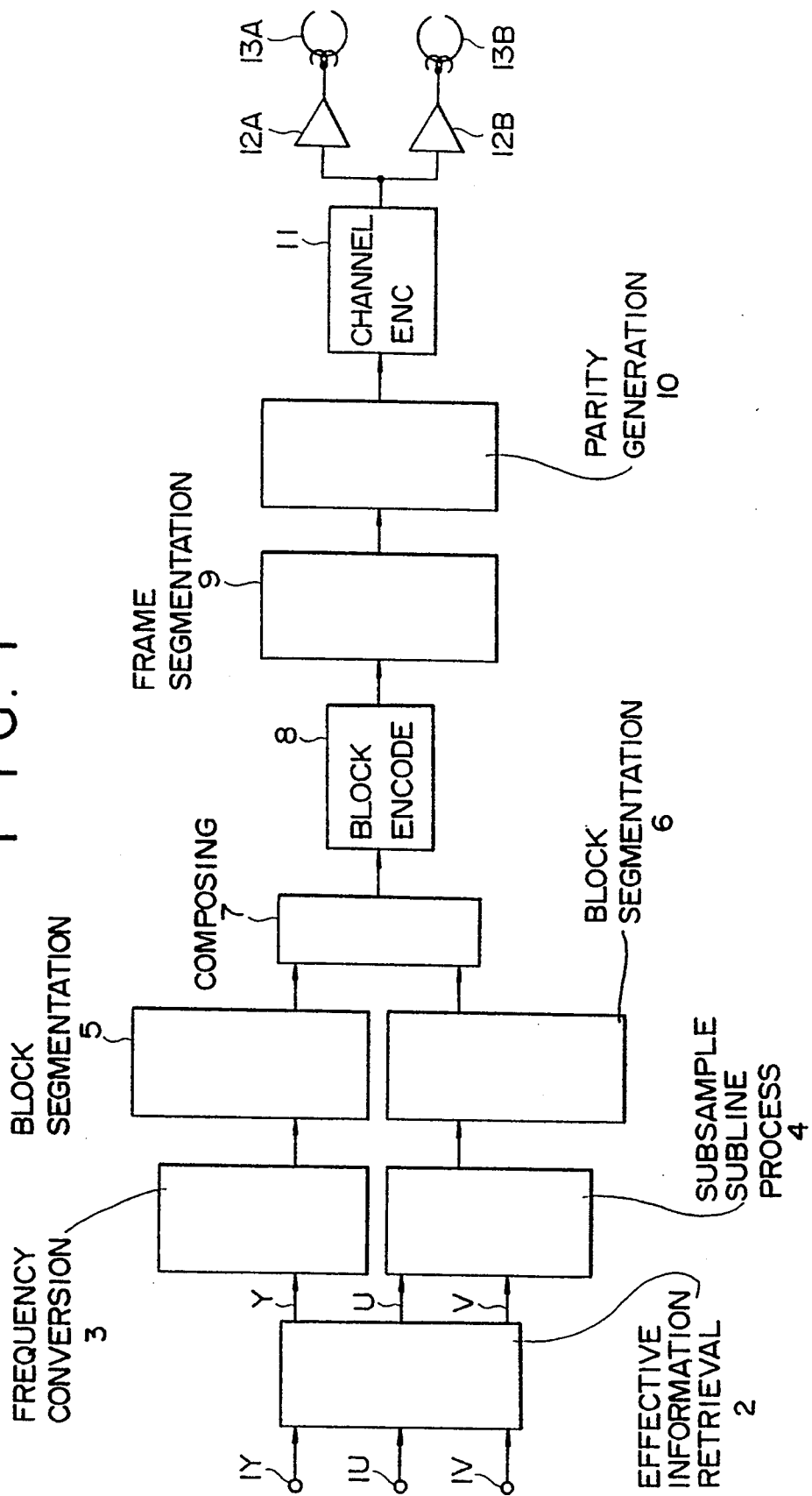
FIG. 1 is a block diagram showing a signal processing portion of a recording circuit in a digital VTR according to an embodiment of the present invention.

First, a signal processing portion of a recording circuit in a digital VTR according to an embodiment of the present invention will be described with reference to FIG. 1 in which a digital luminance signal Y and digital color difference signals U and V, are supplied to input terminals 1Y, 1U, and 1V, respectively, after being formed from three primary color signals R, G, and B output from, for example, a color video camera. In this case, the clock rates of the signals Y, U and V are the same as the frequencies of the component signals in the above described D1 format. In other words, the sampling frequencies are 13.5 MHz and 6.75 MHz for the luminance signal Y and for the color difference signals U and V, respectively, and there are eight bits per sample. Thus, the data rate of the signals sent to the input terminals 1Y, 1U, and 1V is approximately 216 Mbps as was described earlier. An effective information retrieval circuit 2 for removing data from the signals during the blanking intervals and for retrieving only information in the effective area compresses the data to a data rate of approximately 167 Mbps. The luminance signal Y output by the effective information retrieval circuit 2 is sent to a frequency conversion circuit 3 which converts the sampling frequency from 13.5 MHz to $\frac{3}{4}$ thereof, that is, to 10.125 MHz. A thin-out filter may be used for the frequency conversion circuit 3, so as to prevent reflected distortion from taking place.

The output signal from the frequency conversion circuit 3 is sent to a block segmentation circuit 5 which converts the series luminance data into a sequence of blocks. The block segmentation circuit 5 is provided to condition the data for processing by a block encoding circuit 8 disposed at a later stage of the recording circuit.

Figure 3:
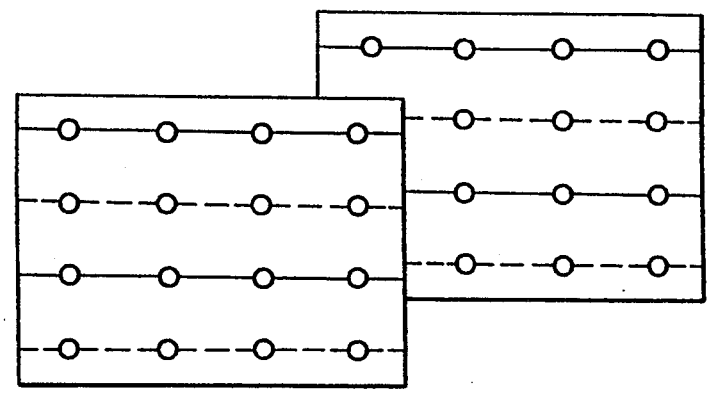
FIG. 3 is a schematic diagram showing an example of a block-by-block encoding.

Reference to FIG. 3 will show a construction of three-dimensional blocks which are used as an encoding unit. By dividing a screen which occupies for example two frames, as shown in FIG. 3, a large number of unit blocks (4 lines×4 picture elements×2 frames) are formed. In FIG. 3, the solid lines represent lines of odd fields, while the dotted lines represent lines of even fields.

Figure 4:
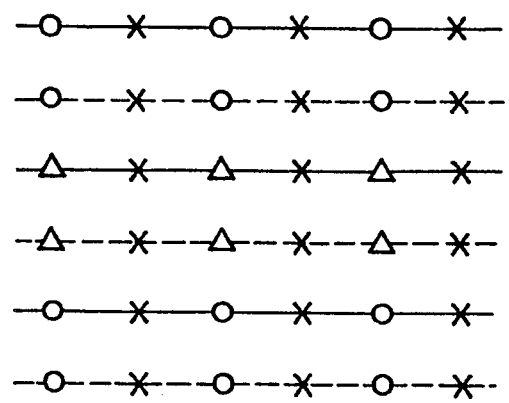
FIG. 4 is a schematic diagram to which reference will be made in describing operation of a subsampling and subline processing circuit.

Returning to FIG. 1, it will be seen that the two color difference signals U and V output from the effective information retrieval circuit 2, are supplied to a subsampling and subline processing circuit 4. The subsampling and subline processing circuit 4 converts the sampling frequency of such signals from 6.75 MHz to one-half thereof, that is, to 3.375 MHz, and then selects the two digital color difference signals one after the other for each line. Thereafter, the subsampling and subline circuit 4 composes the two digital color difference signals into data in one channel and thereby outputs a line sequential digital color difference signal. FIG. 4 shows an arrangement of the picture elements of the signal which are sub-sampled and sub-lined by the circuit 4. In FIG. 4, "0" represents a sampling picture element of the first color difference signal U; "Δ" represents a sampling picture element of the second color difference signal V; and "X" represents a position of a picture element which is being thinned out by the sampling.

The output line sequential signal from the subsampling and subline circuit 4 is supplied to a block segmentation circuit 6. Similarly to the block segmentation circuit 5, the block segmentation circuit 6 converts scanning or line sequential color difference data of television signals into block sequential data. In other words, the block segmentation circuit 6 converts the color difference data into data in a block arrangement (4 lines×4 picture elements×2 frames).

The output signals of the block segmentation circuits 5 and 6 are sent to a composing circuit 7 which converts into data in one channel the luminance signal and the color difference signals which have been converted into block sequential signals. The output signal of the composing circuit 7 is sent to a block encoding circuit 8 for which, as will be described later in detail, an encoding circuit adaptable to the dynamic range of each block, that is, an ADRC circuit, a DCT or Discrete Cosine Transform circuit, or the like can be used. The output signal from the block encoding circuit 8 is sent to a frame segmentation circuit 9 which converts the signal into data in a frame arrangement or construction. The frame segmentation circuit 9 exchanges between a picture system clock and a record system clock.

The output signal from the frame segmentation circuit 9 is supplied to a parity generating circuit 10 which generates a parity of an error correction code. The output signal of the parity generation circuit 10 is supplied to a channel encoder 11 which performs channel encoding so that the low band of the data to be recorded is decreased. The output signal of the channel encoder 11 is supplied through respective recording amplifiers 12A and 12B and rotary transformers (not shown) to rotary magnetic heads 13A and 13B for recording on the magnetic tape.

Although not shown on FIG. 1, an audio signal is compressed and encoded apart from the video signal, whereupon the resulting audio data are multiplexed or mixed with the video data and supplied with the latter to the channel encoder 11.

With the above described signal processing portion of the recording circuit, by removing data during the blanking intervals, the data rate is decreased to approximately 167 Mbps from the input data rate of 216 Mbps. In addition, with the frequency conversion and the sub-sampling and sub-line processing, the resultant data rate is decreased to 84 Mbps. After the resultant data is compressed and encoded by the block encoding circuit 8, the data rate is compressed to approximately 25 Mbps. Thereafter, by adding additional information, such as, a parity and an audio signal, to the resultant compressed data, the bit rate of the data to be recorded amounts to approximately 31.5 Mbps.

The playback circuit of a digital VTR according to an embodiment of this invention will now be described with reference to FIG. 2, in which reproduced data from the magnetic heads 13A and 13B are supplied through respective rotary transformers (not shown) and playback amplifiers 21A and 21B to a channel decoder 22. The channel decoder 22 demodulates channel encoded data, and the resultant output signal is sent to a TBC (time base correction) circuit 23 for removing time base fluctuating components from the reproduced or playback signal.

The playback data which is output from the TBC circuit 23 is supplied to an error correction circuit (ECC) 24 which uses an error correction code to correct and modify errors.

The output signal of the ECC circuit 24 is supplied to a frame disassembling circuit 25 which separates each component of block encoded picture data and exchanges between the recording system clock and the picture system clock. The data separated in the frame disassembling circuit 25 are sent to a block decoding circuit 26 which decodes data in accordance with the original data for each block. The decoded picture data which is output from the block decoding circuit 26 is applied to a distribution circuit 27.

The distribution circuit 27 separates a luminance signal and color difference signals from the decoded data. The luminance signal and the color difference signals are sent to respective block disassembling circuits 28 and 29. The block disassembling circuits 28 and 29 convert the block sequence signals into raster scanning sequence signals, that is, function in opposition to the block segmentation circuits 5 and 6 in the recording circuit.

The decoded luminance signal which is output from the block disassembling circuit 28 is sent to an interpolation filter 30, which converts the sampling rate of the luminance signal from 3 fs to 4 fs (where 4 fs=13.5 MHz). The digital luminance signal Y which is output from the interpolation filter 30 is derived at an output terminal 33Y.

The digital color difference signals which are output from the block disassembling circuit 29 are sent to a distribution circuit 31 which separates digital color difference signals U and V from the line sequential digital color difference signals. The separated digital color difference signals U and V output from the distribution circuit 31 are supplied to an interpolation circuit 32 which interpolates, from the decoded picture element data, the line and picture element data which have been thinned out. The interpolation circuit 32 outputs digital color difference signals U and V with a sampling rate 4 fs, and which are derived at output terminals 33U and 33V, respectively.

The block encoding circuit 8 in the recording circuit of FIG. 1, may be an ADRC (Adaptive Dynamic Range Coding) encoder, which generally detects the maximum value MAX and the minimum value MIN of data representing a plurality of picture elements contained in each block and then detects a dynamic range DR of the block therefrom. Thereafter, the ADRC encoder encodes the data in accordance with the dynamic range and then requantizes the data with bits which are smaller in number than the data bits representing the original picture elements. As an alternative to the foregoing, the block encoding circuit 8 may first DCT (Discrete Cosine Transform) the picture element data of each block, and then quantize coefficient data obtained by the DCT process. Thereafter, the quantized data is compressed by the run-length Huffman encoding process.

Figure 5:
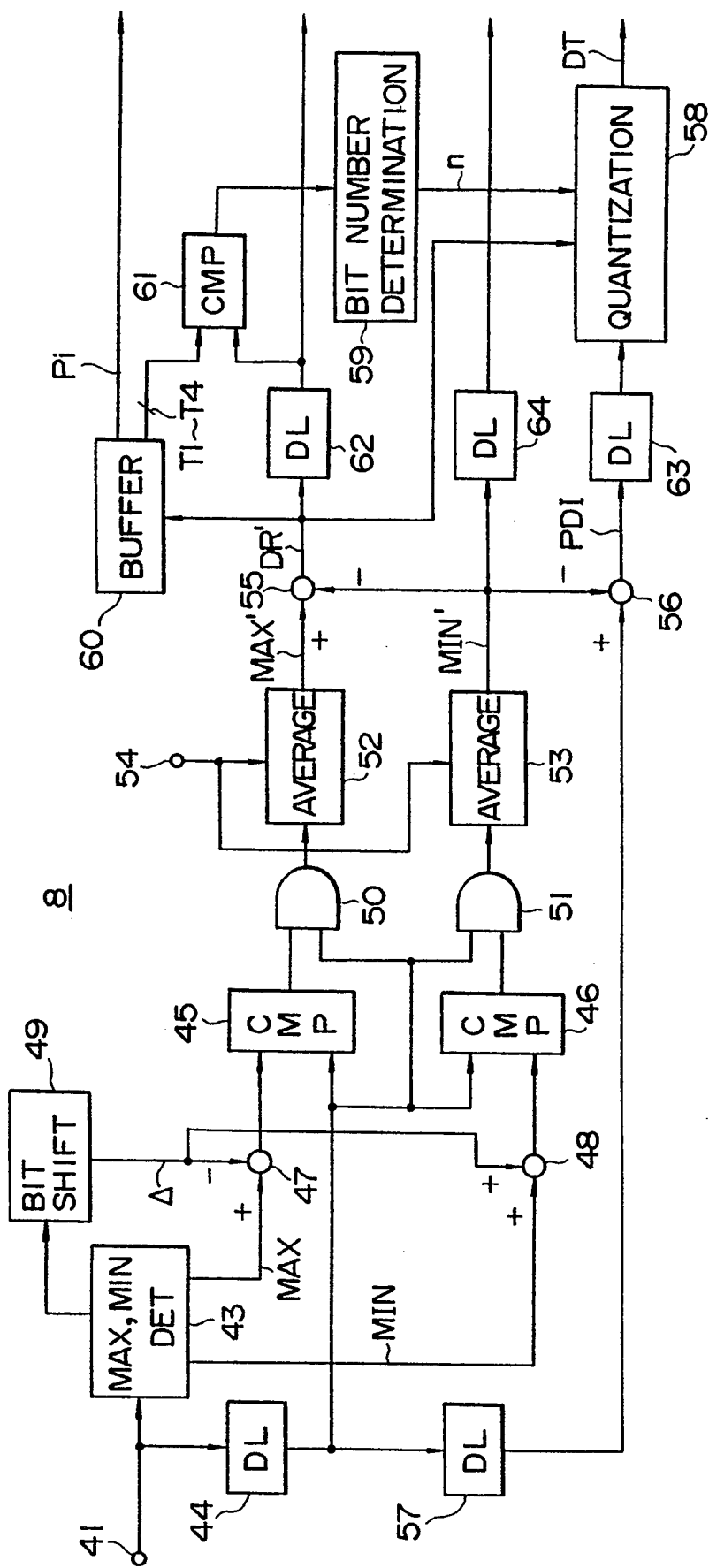
FIG. 5 is a block diagram showing an example of a block encoding circuit that may be included in the recording circuit of FIG. 1.

Referring now to FIG. 5, it will be seen that, in an example of the encoding circuit 8 using an ADRC encoder, and with which picture quality is not degraded by multiple dubbing operations, a digital luminance signal (or a digital color difference signal) having each sample quantized to 8 bits is received from the composing circuit 7 at an input terminal 41 and applied to a maximum value and minimum value detection circuit 43 and a delay circuit 44. The maximum value and minimum value detection circuit 43 detects the minimum value MIN and the maximum value MAX for each block. The delay circuit 44 delays the input data for a time period equivalent to that necessary for detecting the maximum value and the minimum value. The picture element data which is output from delay circuit 44 is applied to comparison circuits 45 and 46.

The maximum value MAX from the maximum value and minimum value detection circuit 43 is applied to one input of a subtraction circuit 47. On the other hand, the minimum value MIN from the maximum value and minimum value detection circuit 43 is applied to one input of an addition circuit 48. The value $\Delta$ of one quantized step width ($\Delta = 1/16$ DR where non-edge matching quantization is performed with a fixed length of 4 bits) is supplied from a bit shift circuit 49 to the other inputs of subtraction circuit 47 and addition circuit 48. In the bit shift circuit 49, the dynamic range DR is shifted by 4 bits so as to perform a deviation of (1/16). The subtraction circuit 47 provides at its output a threshold value of (MAX$-\Delta$). On the other hand, the addition circuit 48 provides at its output a threshold value of (MIN$+\Delta$). The threshold values which are output from the subtraction circuit 47 and the addition circuit 48 are applied to the comparison circuits 45 and 46, respectively, for comparison therein with the delayed picture element data from circuit 44.

The value $\Delta$ which determines the threshold values may be a fixed value equivalent to a noise level rather than the quantizing step width.

The output signal of the comparison circuit 45 is applied to one input of an AND gate 50. Similarly, the output signal of the comparison circuit 46 is applied to one input of an AND gate 51. The output of the delay circuit 44 is also applied to the other inputs of the AND gates 50 and 51. The output signal of the comparison circuit 45 becomes high when the level of the input data is larger than that of the threshold value. Thus, the picture element data of the input data which are in the maximum level range of (MAX to MAX$-\Delta$) are output from the AND gate 50. On the other hand, the output signal of the comparison circuit 46 becomes high when the level of the input data is smaller than that of the threshold value. Thus, the picture element data of the input data which are in the minimum level range of (MIN to MIN$+\Delta$) are output from the AND gate 51.

The output signal of the AND gate 50 is supplied to an averaging circuit 52. Similarly, the output signal of the AND gate 51 is supplied to an averaging circuit 53. These averaging circuits 52 and 53 calculate average values for each block. A reset signal with a block interval is applied from a terminal 54 20 to the averaging circuits 52 and 53. The averaging circuit 52 outputs an average value MAX' of picture element data in the maximum level range of (MAX to MAX$-\Delta$). on the other hand, the averaging circuit 53 outputs an average value MIN' of the picture element data in the minimum level range of (MIN to MIN$+\Delta$). A subtraction circuit 55 subtracts the average value MIN' from the average value MAX' and outputs an adjusted dynamic range DR'.

The average value MIN' is also applied to a subtraction circuit 56. The subtraction circuit 56 subtracts the average value MIN' from input data supplied to circuit 56 through a delay circuit 57. The subtraction circuit 56 outputs data PD1 from which the minimum value is removed. The data PD1 and the adjusted dynamic range DR' are applied to a quantizing circuit 58. In the embodiment being described the ADRC with variable length is used, with the number of bits assigned for quantization being 0 bit (no code signal transmission), 1 bit, 2 bits, 3 bits, or 4 bits, and with an edge matching quantizing operation being performed. The number n of bits assigned is determined for each block by a bit number determination circuit 59. Data representing the bit number n is sent to the quantizing circuit 58.

In the ADRC with variable length encoding, for a block where the dynamic range DR' is small, the bit number n is decreased. Conversely, for a block where the dynamic range DR' is large, the bit number n is increased. As a result, the encoding operation can be effectively performed. In other words, when a threshold value for determining the bit number n is T1 to T4 (where T1$<$T2$<$T3$<$T4), for a block having its DR'$<$T1, the code signal is not transmitted, but only information of the dynamic range DR' is transmitted.

For a block of T1≦=DR'<T2, (n=1) is assigned; for a block of T2 ≦=DR'<T3, (n=2) is assigned; for a block of T3≦=DR'<T4, (n=3) is assigned; and for a block of DR'≧=T4, (n=4) is assigned.

In the ADRC with variable length encoding, by varying the threshold values T1 to T4, the amount of information which is generated can be controlled, that is, the information can be buffered. Thus, even for a transmission path, such as a digital VTR according to the present invention, where the amount of information which is generated has to be set to a particular value, the ADRC with variable length can be applied.

In FIG. 5, a buffering circuit 60 is provided for determining the threshold values T1 to T4 so as to set the amount of information which is generated to a particular value. The buffering circuit 60 contains a plurality of sets of threshold values (T1, T2, T3, T4), for example, 32 sets. The sets of the threshold values are identified by a parameter code Pi (where i=0, 1, 2, ..., 31). As the number i of the parameter code Pi becomes large, the amount of information which is generated is linearly decreased. However, as the amount of information which is generated decreases, the quality of the picture being recorded is degraded.

The threshold values T1 to T4 which are output from the buffering circuit 60 are applied to a comparison circuit 61. The dynamic range DR' is also applied to the comparison circuit 61 through a delay circuit 62. The delay circuit 62 delays the dynamic range DR' for a time period necessary for the buffering circuit 60 to determine a set of the threshold values. The comparison circuit 61 compares the dynamic range DR' of the block with each threshold value. The compared output is sent to the bit number determination circuit 59 and, on the basis thereof, the circuit 59 determines the number of bits to be assigned for the block. The quantizing circuit 58 converts the data PDI, from which the minimum value has been removed, into a code signal DT by an edge matching quantizing operation with the dynamic range DR' and the bit number n being assigned. The quantizing circuit 58 may be in the form of a ROM.

The dynamic range DR' and the average value MIN' are passed through respective delay circuits 62 and 64 before being output. In addition, a parameter code Pi, which represents the code signal DT and the set of threshold values provided by the buffering circuit 60, is output from the circuit 60. In the embodiment of the invention being described, since a signal which has been quantized in a non-edge matching operation is requantized in an edge matching operation in accordance with information concerning the dynamic range, the degradation of pictures being dubbed is small.

Practical arrangements of the channel encoder 11 (FIG. 1) and the channel decoder 22 (FIG. 2) may be as disclosed in Japanese Patent Application No. HEI 1-143,491, having a common assignee herewith, and as now further described with reference to FIGS. 6 and 7, respectively.

Figure 6:
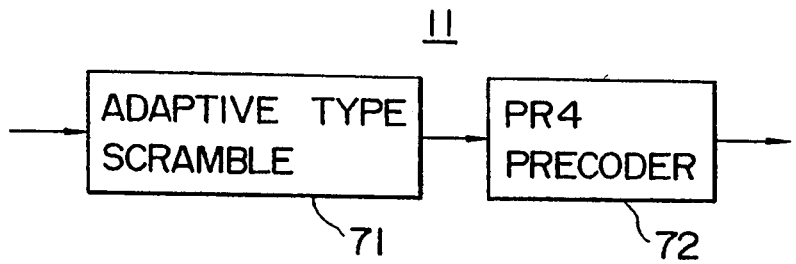
FIG. 6 is a block diagram showing an example of a channel encoder that may be included in the recording circuit of FIG. 1.
Figure 7:
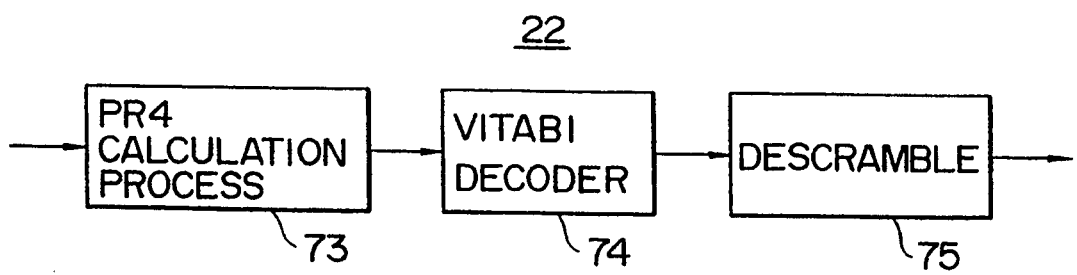
FIG. 7 is a block diagram showing an example of a channel decoder that may be included in the playback circuit of FIG. 2.

More particularly, in the channel encoder 11 of FIG. 6, the output of the parity generation circuit 10 is supplied to an adaptive type scramble circuit 71. In fact, a plurality of M system scramble circuits are provided, with one of such circuits being selected so that the high frequency component and the DC component are smallest therein with respect to the input signal. The output of the scramble circuit 71 is supplied to a partial response class 4 detection type precoder 72.

The precoder 72 calculates $1/(1-D^2)$ (where D is a unit delay or delay operator). The precoder output is supplied to the magnetic heads 13A and 13B through the record amplifiers 12A and 12B, respectively, for recording on the tape. The reproduced signals output from the heads 13A and 13B are amplified by the playback amplifiers 21A and 21B prior to being supplied to a partial response class 4 calculation process circuit 73 in the channel decoder 22 (FIG. 7). The circuit 73 performs the calculation $1+D$ on the reproduced output signals and, the result of such calculation, is supplied to a Viterbi decoding circuit 74 which decodes the output of the calculation process circuit 73 in accordance with the Viterbi algorithm.

As disclosed in "Analog Viterbi Decoding for High Speed Digital Satellite Channels" A. S. Acampora et al, IEEE Transactions on Communications, Vol. Com. 26, No. 10, October, 1978, pages 1463–1470; and in "The Viterbi Algorithm" G. D. Forney, Jr., Proceedings of the IEEE, Vol. 61, No. 3, March 1973, pages 268–278, the Viterbi decoding circuit 74 utilizes likelihood of correlation between data input successively thereto for detecting transit of the data and decodes the data on the basis of the detected result. Since the relationship $(1-D^2)$ of the reproduced signal relative to the signal used for recording (hereinafter referred to as the "recording signal") is utilized to decode the recording signal from the reproduced signal and then the digital video signal is decoded by the circuit 74 on the basis of the decoded data, the bit error rate of the decoded data can be reduced as compared with a standard decoding circuit which decodes data with reference to the signal level. Therefore, the decoded data output by the Viterbi decoding circuit 74 has high noise resistance. More specifically, by reason of the Viterbi decoding circuit 74 in the channel decoder 22, the reproduced C/N (carrier/noise) ratio is improved by 3 dB in respect to that achieved when decoding bit-by-bit.

Figure 2:
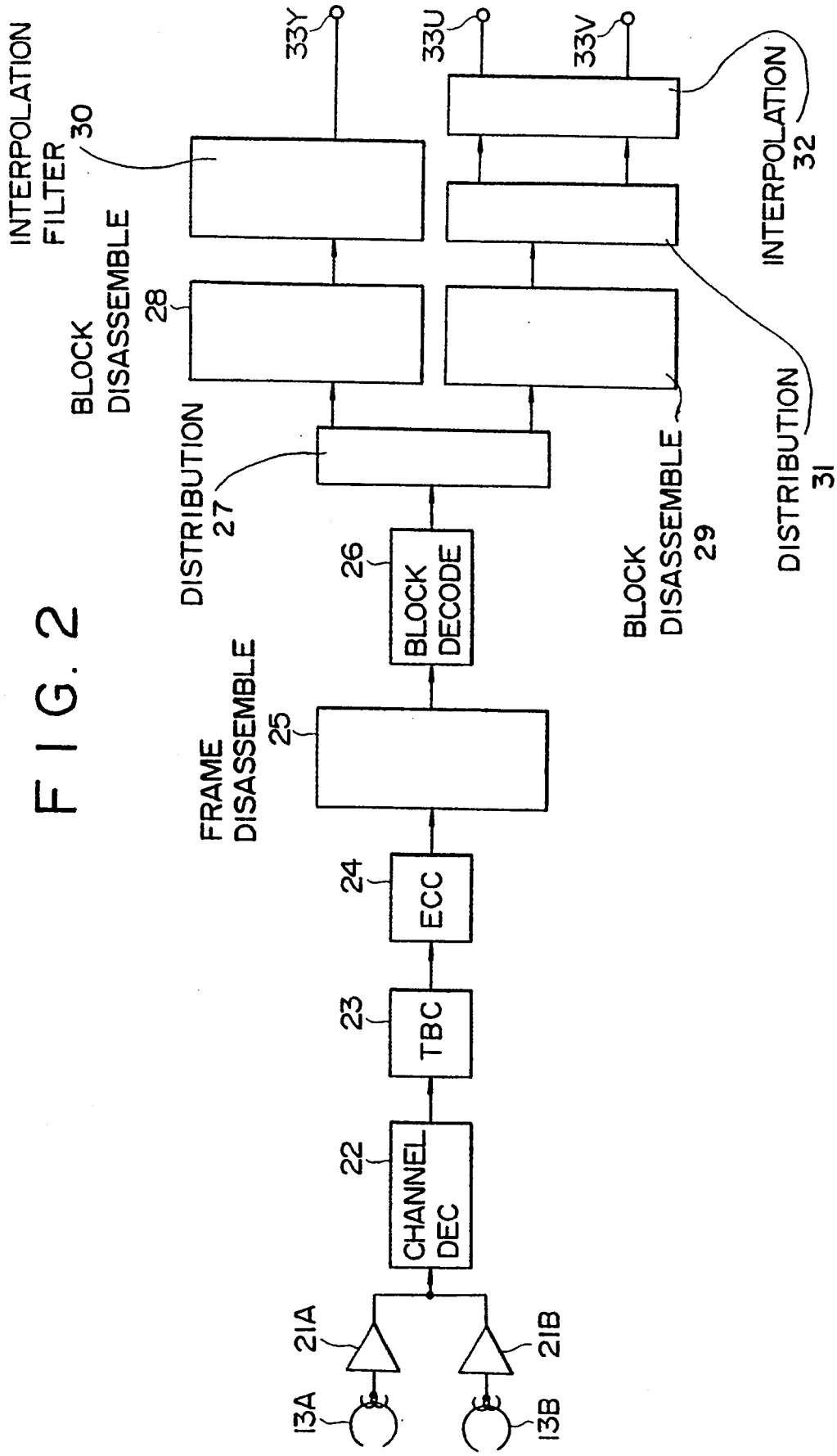
FIG. 2 is a block diagram showing a signal processing portion of a playback circuit in the digital VTR according to the invention.

The output of the Viterbi decoding circuit 74 is supplied to a descrambling circuit 75 which converts the scrambled data back to the original unscrambled data for application to the TBC circuit 23 (FIG. 2).

Figure 8A:
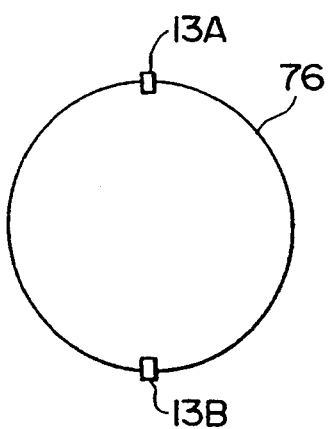
FIGS. 8A and 8B are schematic diagrams illustrating different locations of rotary heads on a tape guiding drum of a VTR.
Figure 8B:
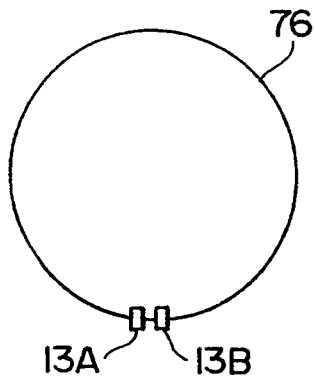

As shown in FIG. 8A, the magnetic heads 13A and 13B may be mounted in diametrically opposed positions on a rotation drum 76. However, as shown in FIG. 8B, the magnetic heads 13A and 13B are desirably mounted on the drum 76 adjacent each other in a unified construction. A magnetic tape (not shown on either FIG. 8A or 8B) is wrapped obliquely on the peripheral surface of the drum 76 with a winding angle which is preferably less than 180°. With the head locations shown in FIG. 8A, the magnetic heads 13A and 13B are alternately contacted with the magnetic tape. On the other hand, with the heads located as shown in FIG. 8B, both of the magnetic heads 13A and 13B scan the magnetic tape at the same time.

Figure 9:
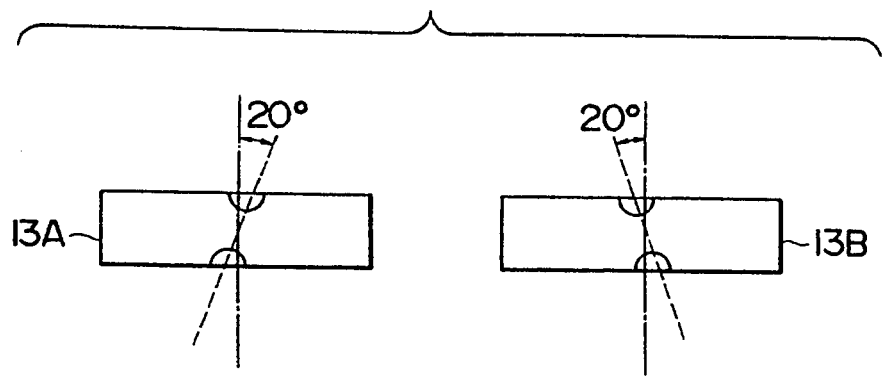
FIG. 9 is a schematic diagram illustrating different azimuths of the heads.
Figure 10:
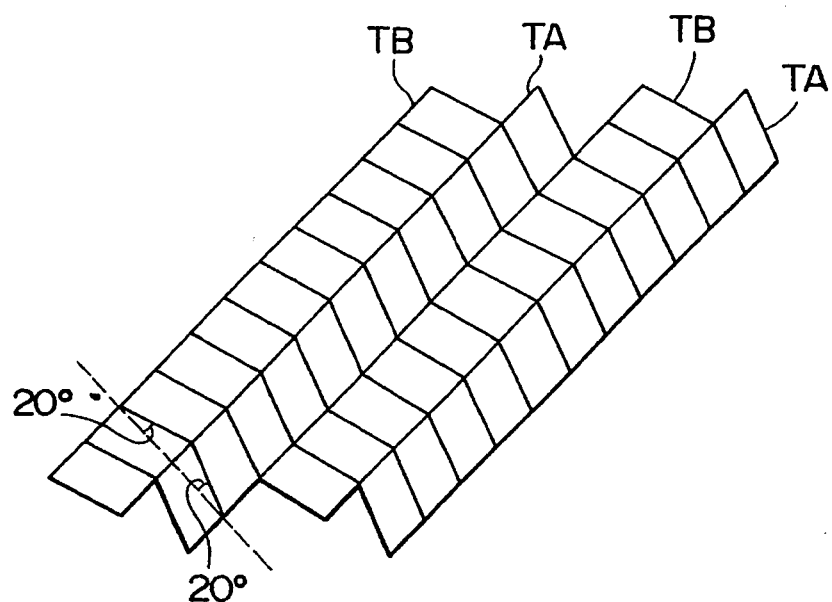
FIG. 10 is a schematic diagram illustrating a recording pattern formed by the heads with different azimuths.

The directions of the gaps of the magnetic heads 13A and 13B differ from each other, that is, the heads 13A and 13B have different azimuth angles. For example, as shown in FIG. 9, azimuth angles of ±20° are given to the magnetic heads 13A and 13B, respectively. By reason of the difference of the azimuth angles, a record pattern is formed on the magnetic tape, as shown in FIG. 10, in which adjacent tracks TA and TB on the magnetic tape are formed by the respective magnetic heads 13A and 13B, which have different azimuth angles. Thus, when the magnetic tape is played back or reproduced, due to an azimuth loss or attenuation which is particularly acute in the case of relatively high frequencies, the amount of cross talk between digital signals recorded in adjacent tracks can be decreased.

Figure 11A:
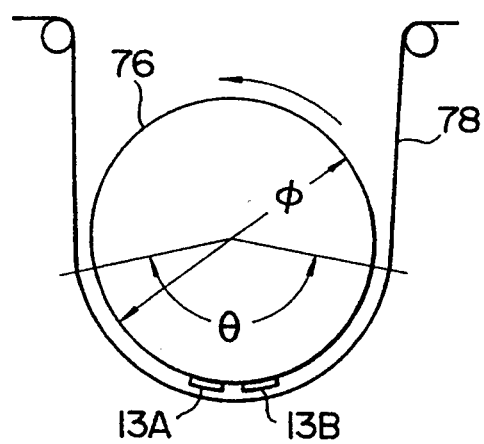
FIGS. 11A and 11B respectively are a top view and a side view showing the wrapping of a tape about a head drum assembly in a digital VTR according to this invention.
Figure 11B:
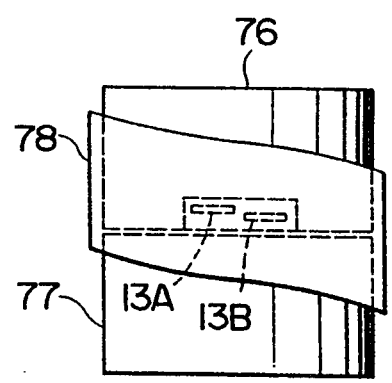

FIGS. 11A and 11B show a practical arrangement in which the magnetic heads 13A and 13B are adjacent each other, as in FIG. 8B and included in a unified structure to provide a so-called double azimuth head. By way of example, the unified magnetic heads 13A and 13B are shown to be mounted on an upper drum 76 which is rotated at a high speed of 150 rps for the NTSC system, while a lower drum 77 is fixed. Therefore, the unified heads 13A and 13B effect 2½ revolutions with the upper drum 76 for each NTSC field so that each field is recorded in five tracks. In other words, each field is divided into five segments recorded in respective tracks on the magnetic tape. By using this segment system, the length of the tracks can be decreased and, as a result, the track linearity error can be decreased. For example, the winding angle Θ of the magnetic tape 78 on the drum assembly 76–77 is desirably set to be less than 180°, for example, approximately 166° and the drum diameter $\phi$ is desirably determined to be less than 25 mm, for example, 16.5 mm.

Figure 12A:
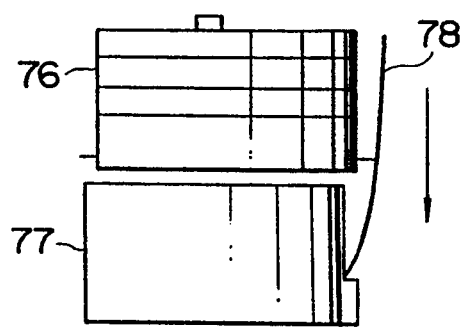
FIGS. 12A and 12B are schematic diagrams to which reference will be made in describing how eccentricity of the head drum results in vibration and non-linearity of the tape.
Figure 12B:
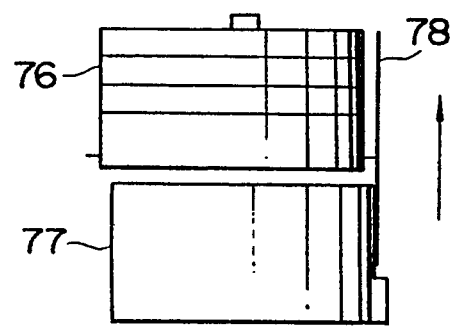

By using the double azimuth head, substantially simultaneous recording is performed by both heads. Normally, due to eccentricity or the like of the rotating upper drum 76 relative to the fixed lower drum 77, the magnetic tape 78 vibrates and thereby a track linearity error takes place. As shown in FIGS. 12A and 12B, if the heads are diametrically opposed, the eccentricity of the rotary upper drum 76 may urge the tape 78 downwardly when one of the heads, for example, the head 13A, traces a track on the tape (FIG. 12A), whereas, the tape 78 is urged upwardly when the other head 13B traces a track on the tape (FIG. 12B). By reason of the foregoing, adjacent tracks will be oppositely bowed and track linearity is substantially degraded. On the other hand, when the magnetic heads 13A and 13B are unified so as to substantially simultaneously scan respective tracks on the tape, any eccentricity of the rotary upper drum 76 similarly influences the linearity of the tracks scanned by both heads so that the linearity error is relatively reduced. Moreover, the distance between the heads 13A and 13B is relatively small when the heads are unified, as in the so-called double azimuth head, so that the paired heads can be more accurately adjusted than when the heads are diametrically opposed.

By using the above described arrangement of the unified heads 13A and 13B simultaneously tracing respective tracks on the tape which has a wrap angle Θ of less than 180° about a relatively small diameter drum, substantial non-linearity of tracks with a narrow width can be avoided and signals recorded in such tracks can be accurately traced during recording and reproducing operations.

The tape used in the magnetic recording apparatus in accordance with this invention is desirably produced in accordance with one of the exemplary methods described below so as to contribute to the attainment of the desired high recording density without an equivalent increase in the bit error rate.

In a first example of a tape producing method embodying this invention, a solution containing an emulsion whose principal component is an acrylic ester latex is coated on a base film composed of a polyethylene tere-phthalate (PET). Thereafter, the base material is dried and thereby only very fine and practically infinitesimal projections made of the emulsion particles are formed. As a result, the surface roughness of the base material, measured as the center line average height Ra, is about 0.0015 $\mu$m and the density of the fine projections is approximately 5,000,000 particles/mm$^2$.

Figure 13:
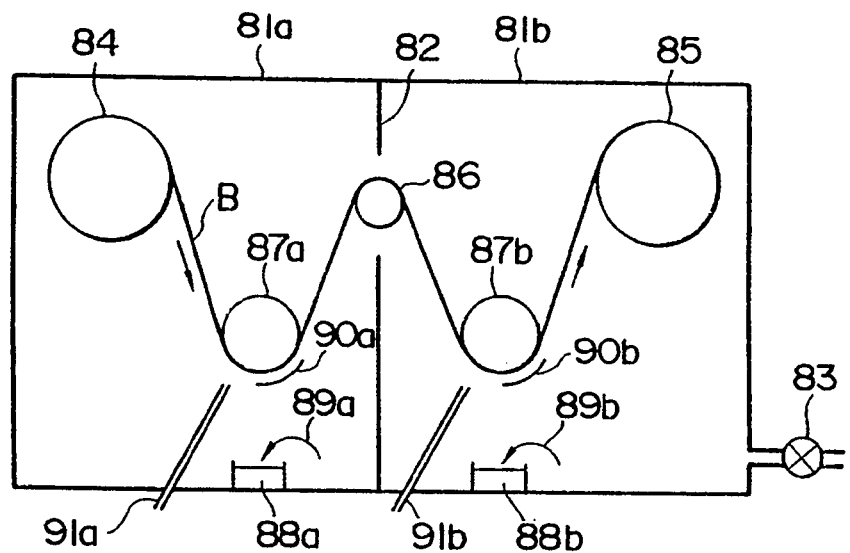
FIG. 13 is a schematic diagram illustrating a method of producing a magnetic tape according to an embodiment of this invention.

Thereafter, by using a vacuum deposition unit shown in FIG. 13, a magnetic layer or coating whose principal component is cobalt (Co) is formed on the base material in an oxygen atmosphere by the so-called diagonal-or slant-deposition method.

More particularly, the vacuum deposition unit of FIG. 13 is shown to include two communicating vacuum chambers 81a and 81b with a partition 82 therebetween, and with a vacuum exhaust valve 83 connected with the chamber 81b and through which both chambers 81a and 81b can be evacuated. A supply roll 84 of the base material B for the magnetic tape is rotatably mounted within the chamber 81a, and a take-up roll 85 on which the completed magnetic tape material is wound is rotatably mounted within the chamber 81b. A guide roller 86 is situated in an opening in the partition 82 approximately at the same level as the rolls 84 and 85, and cylindrical cooling cans 87a and 87b are rotatably mounted within the chambers 81a and 81b, respectively, at levels substantially below that of the guide roller 86 so that the base material B being unwound from the supply roll 84 is led downwardly therefrom under the cooling can 87a, then over the guide roller 86 and under the cooling can 87b prior to being rewound on the take-up roll 85. Evaporation sources of cobalt 88a and 88b which, for example, may be ingots of 100% cobalt, are provided in the chambers 81a and 81b, respectively, and are heated by electron beams indicated schematically at 89a and 89b. Insulating shields 90a and 90b extend below the cooling cans 87a and 87b, respectively, for restricting the incident angles at which cobalt evaporated from the sources 88a and 88b can impinge on the base material B running under the cooling cans 87a and 87b. Finally, the chambers 81a and 81b are provided with oxygen gas supply pipes 91a and 91b for directing flows of oxygen toward the surface of the base material B at areas thereof where evaporated cobalt is being deposited on the base material.

In the above-described vacuum deposition unit, as the web of base material B travels therethrough from the supply roll 84 past the cooling can 87a, the guide roller 86 and the cooling can 87b to the take-up roll 85, two cobalt (Co) film or layers which together form a magnetic coating are successively deposited at an angle to the base material, that is, by the slant deposition method, in an oxygen atmosphere.

The conditions under which such vacuum deposition is effected, are as follows:

The vacuum chambers 81a and 81b are maintained at a vacuum of $1 \times 10^{-4}$ Torr., while the pipes 91a and 91b introduce oxygen at a rate of 250 cc/min. into the vacuum chambers. The shields 90a and 90b are arranged so that the incident angles of the evaporated cobalt relative to the base material B are between 45° and 90°. The cobalt layer or film deposited on the base material at each of the cooling cans 87a and 87b is provided with a thickness of 1,000 angstrom units (Å), so that the total thickness of the magnetic layer formed on the base material is 2,000 Å.

After the magnetic coating composed of two cobalt films or layers has been formed on the web of base material B, the back or underside of the base material is coated with a uniform mixture of carbon and epoxy resin binder, and the cobalt magnetic coating or layer is top coated with a perfluoro-polyether, as a lubricant. Preferably, the thickness of the base material B is selected so that the overall thickness of the coated web of base material is no greater than 7 μm. Finally, the coated web of base material B is cut into strips having widths of 8 mm so as to produce the desired 8 mm format magnetic tapes.

The magnetic tape produced as described above, has been found to have the following characteristics:
 a residual magnetic flux density (Br) of 4,150 G;
 a coercive force Hc of about 1760 Oe;
 a rectangular ratio (Rs) of 79%; and
 a surface roughness with a center line average height (Ra) as small as 0.002 μm, which is due to the very low surface roughness of the base material B.

The energy product in the above case, that is, the product of the residual magnetic flux density (Br), the coercive force (Hc) and the thickness (δ) of the magnetic coating, is as follows:

$$(Br) \cdot (\delta) \cdot (Hc) = 4.150 \; G. \times 2,000 \; Å \times 1760 \; Oe$$
$$= 146.1 \; G \cdot Cm \cdot Oe$$

Although surface roughnesses are usually measured in accordance with JIS B 0601, the above noted surface roughness was measured under the following conditions:
 measuring instrument: Talystep (from Rank/Taylor, Inc.)
 stylus diameter: 0.2×0.2 μm (rectangular stylus)
 stylus pressure: 2 mg
 high-pass filter: 0.33 Hz.

In a second example of a tape producing method embodying this invention, the base material B is produced in the same manner as in the first example, and is then disposed in the vacuum deposition unit of FIG. 13. However, in the present example, the evaporation sources 88a and 88b within the vacuum chambers 81a and 81b are ingots of 90% cobalt and 10% nickel, that is, $Co_{90} Ni_{10}$ alloy. In the present example, the magnetic coating on the base material B consists of two $Co_{90} Ni_{10}$ alloy films which are diagonally or slant deposited on the base material in the oxygen atmosphere produced by the introduction of oxygen gas into the vacuum chambers 81a and 81b at the rate of 230 cc/min. The $Co_{90} Ni_{10}$ alloy films or layers are each deposited to a thickness of 900 Å at the cylindrical cooling cans 87a and 87b. Thus, the total thickness of the magnetic coating is 1,800 Å. Thereafter, the coated web of base material B is treated in the same way as in the first described example so as to produce the desired 8 mm format magnetic tapes.

The magnetic tape produced in the second example, has been found to have the following characteristics:
 a residual magnetic flux density (Br) of 4,100 G;
 a coercive force (Hc) of 1,440 Oe;
 a rectangular ratio (Rs) of 79%; and
 a surface roughness (Ra) of 0.002 μm. Further, in the case of the tape according to the second example, the energy product thereof is:

$$(Br) \cdot (\delta) \cdot (Hc) = 106.3 \; G.cm.Oe$$

In a third example of a tape producing method embodying this invention, the base material B is formed in the manner described above in the first example, and is then disposed in a vacuum deposition unit of the type illustrated in FIG. 14. Such vacuum deposition unit is shown to include upper and lower vacuum chambers 81c and 81d, respectively, with a horizontal partition 82 therebetween, and with a supply roll 84 and a take-up roll 85 rotatably mounted at spaced apart locations within the upper vacuum chamber 81c. A single cylindrical cooling can 87 is rotatably mounted between the chambers 81c and 81d and extends through an opening in the partition 82. The web of base material B unwound from the supply roll 84 is led by a guide roll 86a so as to run around the cylindrical cooling can 87 within the vacuum chamber 81d and then be guided from the can 87 by a guide roll 86b for rewinding on the take-up roll 85. A single evaporation source 88 of $Co_{90} Ni_{10}$ alloy is disposed within vacuum chamber 81d below cooling can 87 and is heated by an electron beam 89 emitted by an electron source 92. An insulating shield 90 extends under the can 87 for restricting the incident angles at which the $Co_{90} Ni_{10}$ alloy evaporated from the source 88 can impinge on the base material B running under the cooling can 87. An oxygen gas supply pipe 91 extends between the shield 90 and the can 87 for directing a flow of oxygen toward the surface of the base material B at the area thereof where evaporated $Co_{90} Ni_{10}$ alloy is being deposited on the base material.

In the vacuum deposition unit shown on FIG. 14, a single film of $Co_{90} Ni_{10}$ alloy is diagonally deposited on the base material B at the cooling can 87 in the oxygen atmosphere for forming the magnetic layer. During such operation of the vacuum deposition unit of FIG. 14, the vacuum chambers 81c and 81d are maintained at a vacuum of $1 \times 10^{-4}$ Torr., for example, through vacuum connections 83c and 83d, while oxygen gas is introduced through the pipe 91 at a rate of 250 cc/min. Once again, the shield 90 is positioned so that the incident angles of the evaporated $Co_{90} Ni_{10}$ alloy relative to the base material B on the cooling can 87 are between 45° and 90°. The deposition of the $Co_{90} Ni_{10}$ alloy on the base material for forming the magnetic coating is timed so that the thickness of the resulting magnetic coating is substantially 2,000 Å. Subsequently, the coated base material is further treated, as in the first example, so as to provide the desired 8 mm format magnetic tapes therefrom.

The magnetic tape produced in the third example has been found to have the following characteristics:
 a residual magnetic flux density (Br) of 3,900 G;
 a coercive force (Hc) of 1,420 Oe;
 a rectangular ratio (Rs) of 78%; and
 a surface roughness with a center line average height (Ra) as small as 0.002 μm. Further, the energy product of the magnetic coating on the tape produced in accordance with the third example is found to be 110.76 G.cm.Oe.

In a fourth example, of a tape producing method embodying this invention, use is made of the vacuum deposition unit shown in FIG. 14, but with the evaporation source 88 being constituted by an ingot of $Co_{95} Ni_5$ alloy. In this example, diagonal deposition of a single film of the $Co_{95} Ni_5$ alloy is effected while oxygen gas is introduced at the rate of 220 cc/min. Such deposition is continued until the thickness of the magnetic coating is 2,000 Å, and thereafter the coated base material is further treated, as in the first example, to provide the desired 8 mm format magnetic tapes.

The magnetic tape produced in the fourth example has been found to have the following characteristics:
 a residual magnetic flux density (Br) of 4,160 G;

a coercive force (Hc) of 1,690 Oe;
a rectangular ratio (Rs) of 77%; and
a surface roughness with a center line average height (Ra) as small as 0.002 μm. The energy product in this case is 140.6 G.cm.Oe.

Figure 15:
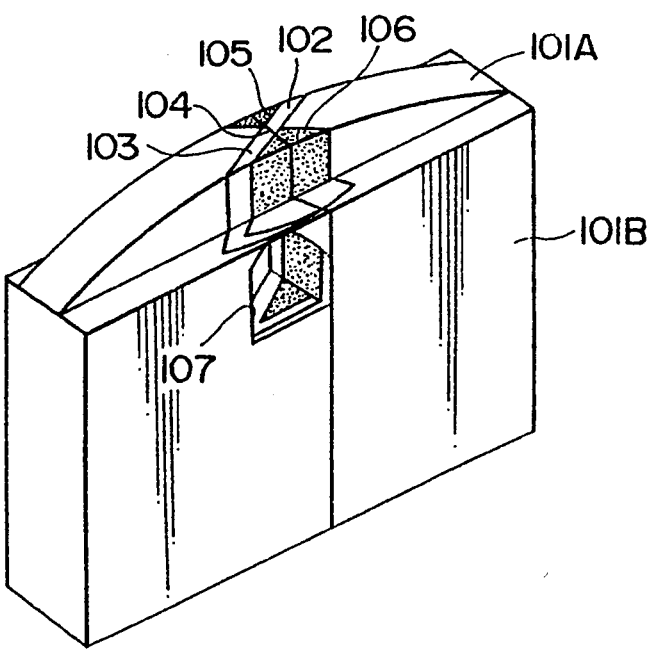
FIG. 15 is a perspective view showing an example of a preferred construction of a magnetic head according to an embodiment of this invention.

Referring now to FIG. 15, it will be seen that a magnetic head desirably used in a magnetic recording apparatus embodying the present invention has monocrystal Mn-Zn ferrite cores 101A and 101B on which Fe-Ga-Si-Ru soft magnetic layers 102 and 103 are formed, by sputtering, for forming a gap 104 therebetween. Both sides of the gap 104, in the direction of the track width, are filled with glass, as at 105 and 106, to limit the effective gap length to 0.20 μm, and thereby limit the track width to approximately 4 μm. A winding hole 107 is provided for receiving a recording coil (not shown).

Since the magnetic head of FIG. 15 provides the Fe-Ga-Si-Ru soft magnetic layers 102 and 103 having a saturation magnetic flux density Bs of 14.5 kG in the vicinity of the gap 104, it is possible for the magnetic head to record data on a magnetic tape of high coercive force without causing magnetic saturation within the head.

By using the (ME) metal evaporated tape produced in accordance with any one of the first through fourth examples and the magnetic head as described above, a recorded bit area of 1.25 μm²/bit or less can be achieved, so as to obtain an areal recording density of at least 0.8 bits/μm². In other words, the described ME tape and magnetic head make it possible to record a signal with the shortest wavelength of 0.5 μm on a track having a width of 5 μm so that the bit area of 1.25 μm²/bit can be achieved while minimizing the deterioration of the C/N ratio of the reproduced output that otherwise results as the recording wavelength and track width are reduced.

In 1988, the assignee of this application produced an experimental consumer digital VTR which incorporated an ADRC bit reduction scheme, scrambled NRZ coding, a class IV partial response (PR4) detection scheme, and a modified 8 mm video transport mechanism used with ME tape. With a rotary drum having a diameter of 40 mm and a rotation speed of 60 rps, and using a track pitch of 15 μm at the wavelength of 0.5 μm, a raw bit error rate of $4 \times 10^{-5}$ and a C/N of 51 dB (with a resolution bandwidth of 30 KHz) at the half-Nyquist frequency were obtained. When such experimental consumer digital VTR was used with a track width of 5 μm, the C/N obtained was only approximately 44 dB and the picture quality was correspondingly degraded. However, the various features described above in respect to the magnetic tape and heads used for magnetically recording digital data in accordance with this invention, help to compensate for the reduction of the C/N by 7 dB, that is, make it possible to obtain a C/N of 51 dB with a track pitch of 5 μm. In connection with the foregoing, it is known that an increase in the space between the tape and the magnetic head when recording or reproducing a signal on the tape causes the signal output level to decrease. Further, it is known that the space between the tape and the magnetic head depends on the flatness of the tape. In the case of a tape of the coated-type, the flatness of the tape depends on the coating material that is used, whereas, in the case of a vacuum deposited tape, such as, the ME tape used in accordance with this invention, the flatness of the tape surface depends on the smoothness of the base material on which the metal is vacuum deposited.

It has been determined that, when the surface of the base film is made as flat as possible, for example, as described above, the C/N is increased by 1 dB. Furthermore, by effecting the vacuum deposition of primarily cobalt on such base material or film in the manner described above with reference to FIGS. 13 and 14, the C/N ratio is further improved by 3 dB, as compared with the tape used in the experimental consumer digital VTR produced in 1988. Further, by using a Viterbi channel decoding scheme, as described above, there is realized a further increase of 3 dB in the C/N ratio over the bit-by-bit decoding scheme employed in the experimental apparatus.

As a result, the deterioration of 7 dB in the C/N ratio associated with a reduction of the track pitch to 5 μm is fully compensated so that, with a recording density resulting in a bit area of 1.25 μm²/bit, the described embodiment of this invention makes it possible to achieve a raw bit error rate of $4 \times 10^{-5}$, that is, a raw bit error rate equivalent to that achieved by the experimental apparatus of 1988 with a track pitch of 15 μm. In connection with the foregoing, it is to be noted that the raw bit error rate, that is, the bit error rate prior to correction, needs to be $10^{-4}$ or less in order to ensure that the errors will be contained within a correctable amount when error correction codes with a redundancy of about 20% are employed.

By way of summary, in accordance with this invention, the magnetic layer of the recording medium used for magnetically recording digital video signals has an energy product of at least 100 G.cm.Oe, and a surface roughness which is at most 0.003 μm in center line average height. By reason of these characteristics, even if the recorded bit area is reduced to about 1 μm² per bit, the raw bit error rate, that is, the bit error rate prior to error correction of the digital video signals reproduced from the magnetic recording medium, is reduced to no more than $1 \times 10^{-4}$.

Having described illustrative embodiments of the invention with reference to the accompanying drawings, it is to be understood that the invention is not limited thereto, and that various changes and modifications can be effected therein by one skilled in the art without departing from the scope or spirit of the invention as defined in the appended claims.

What is claimed is:

1. An apparatus for magnetically recording digital video signals, comprising:
   a magnetic tape wound in a cassette and having a width of no more than approximately 8 mm and a thickness of no more than approximately 7 μm, said tape including a nonmagnetic base on which there is a magnetic layer composed of at least one thin magnetic metal film and having an energy product of at least 100 G.cm.Oe, and a surface roughness of at most 0.003 μm, as measured in center line average height;
   data processing means for reducing the data of said input digital video signal by a ratio of approximately 1:9 so as to provide a recordable signal having a reduced data bit rate; and
   means for recording said reduced data bit rate signal in successive skewed tracks on said tape with an areal recording density of at least approximately 0.8 bit/μm².

2. An apparatus as in claim 1; in which said input digital picture signal is comprised of as much as $4.9 \times 10^{12}$ bits of data, and said reduced data bit rate signal corresponding thereto is recorded on not more than approximately 165 meters of said tape.

3. An apparatus as in claim 1; in which said means for recording provides each of said skewed tracks with a width of approximately 5.0 μm.

4. An apparatus as in claim 1; in which said reduced data bit rate signal is recorded with a minimum wavelength of 0.5 μm.

5. An apparatus as in claim 1; in which said data processing means includes block segmenting means for converting said input digital video signal into data segmented into blocks each composed of a plurality of pixel data;

encoding means for compressing and encoding the pixel data of each of said blocks; and channel encoding means for channel encoding the encoded data from said encoding means.

6. An apparatus as in claim 1; in which said means for recording includes rotary magnetic heads each having portions of a magnetic metal material with a saturation magnetic flux density of at least 14 kG and between which a gap of the respective head is defined.

7. An apparatus as in claim 6; in which said magnetic layer of the magnetic tape is composed of a plurality of the thin magnetic metal films deposed successively on said base.

8. An apparatus as in claim 5; in which said magnetic layer of the magnetic tape is composed of a plurality of the thin magnetic metal films deposited successively on the base.

9. An apparatus as in claim 5; in which said means for recording provides each of said skewed tracks with a minimum width of approximately 4.0 μm.

10. An apparatus as in claim 1; in which said reduced data bit rate signal is recorded with a minimum wavelength of 0.4 μm.

11. An apparatus as in claim 1; in which said magnetic tape has a surface roughness of approximately 0.0015 μm.

12. An apparatus as in claim 1; in which said means for recording includes a rotating drum having a circumferential surface upon which said magnetic tape is partially wound so as to have a winding angle thereon of less than 180°.

13. An apparatus as in claim 1; in which said means for recording includes at least two recording heads for recording in adjacent tracks, and in which said two recording heads have gaps with different azimuth angles of approximately ±20°.

* * * * *